(12) United States Patent
Kuroda et al.

(10) Patent No.: US 10,353,246 B2
(45) Date of Patent: *Jul. 16, 2019

(54) LIQUID CRYSTAL DISPLAY DEVICE AND POLARIZER PROTECTIVE FILM

(71) Applicant: Dai Nippon Printing Co., Ltd., Tokyo (JP)

(72) Inventors: Takashi Kuroda, Tokyo (JP); Seiichi Isojima, Tokyo (JP); Norinaga Nakamura, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/990,106

(22) Filed: Jan. 7, 2016

(65) Prior Publication Data

US 2016/0116802 A1    Apr. 28, 2016

Related U.S. Application Data

(63) Continuation of application No. 13/630,511, filed on Sep. 28, 2012, now Pat. No. 9,261,728.

(30) Foreign Application Priority Data

Sep. 30, 2011   (JP) .................................. 2011-218505
Jul. 2, 2012    (JP) .................................. 2012-148668

(51) Int. Cl.
*G02F 1/13363*    (2006.01)
*G02F 1/1335*    (2006.01)
(Continued)

(52) U.S. Cl.
CPC .......... *G02F 1/133634* (2013.01); *G02B 1/10* (2013.01); *G02B 5/3083* (2013.01);
(Continued)

(58) Field of Classification Search
CPC ... G02B 1/10; G02B 5/3083; G02F 1/133528; G02F 1/133634; G02F 2202/40; G02F 2413/12; Y10T 428/105
See application file for complete search history.

(56) References Cited

U.S. PATENT DOCUMENTS 4,592,623 A * 6/1986 Yamamoto ........... G02B 5/3033
349/122
6,285,430 B1 9/2001 Saito
(Continued)

FOREIGN PATENT DOCUMENTS

CN   101799564 A   8/2010
CN   102081254 A   6/2011
(Continued)

OTHER PUBLICATIONS

Dictionary of Flat Panel Display Technology, Dec. 2001, pp. 147-148.
(Continued)

*Primary Examiner* — Sophie Hon
(74) *Attorney, Agent, or Firm* — Hamre, Schumann, Mueller & Larson, P.C.

(57) ABSTRACT

The present invention aims to provide a liquid crystal display device highly suppressing occurrence of rainbow interference pattern in displayed images. The present invention is a liquid crystal display device including: a back light source, a liquid crystal cell, a color filter, a polarizer, and a polarizer protective film arranged in the stated order, wherein the polarizer protective film has a retardation of not less than 6000 nm, and a difference (nx−ny) of not less than 0.05 between a refractive index (nx) in a slow axis direction that is a highest refractive index direction and a refractive index (ny) in a fast axis direction that is orthogonal to the slow axis direction, and an absorption axis of the polarizer
(Continued)

and the slow axis of the polarizer protective film are arranged to form an angle within a range of 0°±30° or 90°±30°.

3 Claims, 2 Drawing Sheets

(51) Int. Cl.
*G02B 1/10* (2015.01)
*G02B 5/30* (2006.01)

(52) U.S. Cl.
CPC .... *G02F 1/133528* (2013.01); *G02F 2202/40* (2013.01); *G02F 2413/12* (2013.01); *Y10T 428/105* (2015.01)

(56) References Cited

U.S. PATENT DOCUMENTS

| | | | |
|---|---|---|---|
| 2004/0001040 A1* | 1/2004 | Kardach | G02F 1/133603 345/102 |
| 2006/0078693 A1* | 4/2006 | Ishibashi | G02B 5/3083 428/1.31 |
| 2006/0286313 A1 | 12/2006 | Fukagawa et al. | |
| 2007/0184212 A1 | 8/2007 | Nimura et al. | |
| 2008/0094707 A1* | 4/2008 | Tsukane | B32B 27/34 359/507 |
| 2010/0073610 A1 | 3/2010 | Fukuda et al. | |
| 2011/0177262 A1 | 7/2011 | Kim et al. | |
| 2012/0229732 A1* | 9/2012 | Koike | G02F 1/13363 349/69 |
| 2014/0104519 A1 | 4/2014 | Murata et al. | |

FOREIGN PATENT DOCUMENTS

| | | | |
|---|---|---|---|
| JP | 59-077401 | | 5/1984 |
| JP | 69-077401 | | 5/1984 |
| JP | 5977401 | A | 5/1984 |
| JP | 59077401 | A * | 5/1984 ........... G02B 5/3033 |
| JP | 2004-205773 | A | 7/2004 |
| JP | 2005-321542 | A | 11/2005 |
| JP | 2006-106427 | A | 4/2006 |
| JP | 2008-040309 | A | 2/2008 |
| JP | 2008-248208 | A | 10/2008 |
| JP | 2009-113433 | A | 5/2009 |
| JP | 2009-157343 | | 7/2009 |
| JP | 2009-157348 | | 7/2009 |
| JP | 2009-175685 | | 8/2009 |
| JP | 2010-054824 | | 3/2010 |
| JP | 2010-080107 | A | 4/2010 |
| JP | 2010-181500 | | 8/2010 |
| JP | 2010-204630 | A | 9/2010 |
| JP | 2010-217844 | | 9/2010 |
| JP | 2010-262274 | A | 11/2010 |
| JP | 2010-277028 | A | 12/2010 |
| JP | 2011-022481 | | 2/2011 |
| JP | 2011-059263 | A | 3/2011 |
| JP | 2011-059488 | | 3/2011 |
| JP | 2011-100051 | A | 5/2011 |
| JP | 2011-107198 | A | 6/2011 |
| JP | 2011-112928 | A | 6/2011 |
| JP | 2011-203642 | | 10/2011 |
| JP | 4962661 | B2 | 6/2012 |
| KR | 20060101346 | A | 9/2006 |
| KR | 10-2008-0086122 | | 9/2008 |
| KR | 10-2009-0117641 | | 11/2009 |
| KR | 10-2010-0003715 | | 1/2010 |
| KR | 10-2011-0037206 | | 4/2011 |
| KR | 10-2011-0059522 | | 6/2011 |
| TW | 201128268 | A | 8/2011 |
| WO | WO 2011/0588774 | | 5/2011 |
| WO | WO-2011/162198 | A1 | 12/2011 |
| WO | 2012/157662 | | 11/2012 |

OTHER PUBLICATIONS

BJ Lee, Epistar Corporation, 2015 DOE SSL R & D Workshop, Global LED Manufacturing, LED's Brightest Link, Jan. 27, 2015, 5 pages.

Kobayashi, et al., "Novel High Retardation Polymer Film and It's Applications", 15th Microoptics Conference, Oct. 25-28, 2009, pp. 30-31.

* cited by examiner

LIQUID CRYSTAL DISPLAY DEVICE AND POLARIZER PROTECTIVE FILM

RELATED APPLICATIONS

This application is a Continuation of application Ser. No. 13/630,511, filed on Sep. 28, 2012; and this application claims priority of Application No. 2011-218505 filed in Japan on Sep. 30, 2011 under 35 U.S.C. § 119; and this application claims priority of Application No. 2012-148668 filed in Japan on Jul. 2, 2012 under 35 U.S.C. § 119. The entire contents of each application is hereby incorporated by reference.

TECHNICAL FIELD

The present invention relates to a liquid crystal display device and a polarizer protective film used in the liquid crystal display device.

BACKGROUND ART

Liquid crystal display devices have become rapidly in widespread use, instead of conventional CRT displays, because of their features such as low power consumption, lightweight properties, and thin profiles.

A common display device has, as illustrated in FIG. 2, for example, aback light source (not illustrated), a polarizer 25 on the back light side, a liquid crystal cell 21, a color filter 22, and a polarizer 23 on the screen side. The polarizers 23 and 25 each selectively transmit linearly polarized light having a vibrating surface in a specific vibrating direction only, and are arranged to face each other in a cross-Nicol configuration so that the vibrating directions are orthogonal to each other. The liquid crystal cell 21 is placed between the polarizers 23 and 25.

Polarizers used in a liquid crystal display device commonly have polarizer protective films. Films formed of cellulose esters typically such as triacetylcellulose have been commonly used as the polarizer protective films. Such use is based on an advantage that cellulose esters hardly influence the display quality because of their low retardation values. In addition, the use is also based on an advantage that moistures left in a polarizing device in production of a polarizer can be dried through the polarizer protective film owing to appropriate permeability of cellulose esters. Moreover, comparative inexpensiveness of cellulose ester films also contributes to the use.

Various problems, however, are left when such cellulose ester films are considered as a material supporting a liquid crystal display device industry that will continue to expand. Particularly serious problems are mentioned below.

First, production of cellulose ester films commonly employs a so-called solution casting method including the steps of casting a solution containing a cellulose ester dissolved in an organic solvent on a supporting member, drying the solvent, and peeling the dried product to give a film. Such solution casting method requires large-scale equipment and special techniques for the solvent drying step and the like. Accordingly, only manufacturers having special techniques can produce the films, failing to meet the demand from an expanding market of liquid crystal display devices. In the future, too-much dependence on the cellulose ester films as polarizer protective films may disturb development of the liquid crystal display device industry that is now a major industry of our country.

Additionally, in production of cellulose ester films by the solution casting method, dichloromethane is commonly used as a main solvent in an organic solvent used in a cellulose ester solution. The dichloromethane is, however, suspected of being harmful to human bodies. Accordingly, dependence on cellulose ester films in future increases the consumption and the discharge of dichloromethane along with the development of the liquid crystal display device industry, which is environmentally undesirable.

To solve such problems of cellulose ester films, use of a general-purpose film that is commercially available or easily produced by a simple method, as a polarizer protective film has been desired. For example, use of polyester films such as polyethylene terephthalate films, instead of cellulose ester films, is now tested (see Patent Literature 1).

CITATION LIST

Patent Literature

Patent Literature 1: JP-A 2004-205773

SUMMARY OF INVENTION

Technical Problem

Studies made by the present inventors, however, clarified a problem that use of a polyester film such as a polyethylene terephthalate (PET) film as an alternative of a cellulose ester film causes nonuniformity with different colors (hereinafter, also referred to as "rainbow interference pattern") in a liquid crystal display device, especially in an oblique view of a display screen, resulting in lowered display quality of the liquid crystal display device.

Here, the rainbow interference pattern is the phenomenon of the color (interference color) observable by the interference light of the whole display screen of the display device, and the interference color is not color uniformity but color nonuniformity such as streaky pattern.

The present inventors have made further investigations to solve such a problem occurring in the case of using a polyester film as a polarizer protective film to find out the following solution. That is, use of a polyester film having a reasonably high retardation value as a polarizer protective film reduces the problem of rainbow interference pattern, compared to the case of a polarizer protective film formed of a conventional polyester film.

The liquid crystal display device disclosed in JP-A 2011-107198, for example, is known as a liquid crystal display device including a polyester film having a reasonably high retardation value as a polarizer protective film. In the liquid crystal display device, a polarizer is provided on the view side of liquid crystal cells and a polymer film having a retardation of 3000 to 30000 nm is provided on the view side of the polarizer. The slow axis of the polymer film and the absorption axis of the polarizer are arranged to form an angle of about 45 degrees. An oriented polyester film is used as the polymer film. According to the liquid crystal display device, the problem of rainbow interference pattern is solved to some extent even when displayed images are seen over a polarizer such as sunglasses, compared to the case of using a conventional polyester film as a polarizer protective film.

Increasingly high definition images are now displayed on liquid crystal display devices and extremely high quality images are desired. Accordingly, rainbow interference pattern on display screens of the liquid crystal display devices needs to be more highly suppressed.

Conventional polarizer protective films have failed to sufficiently satisfy a demand for high suppression of rainbow interference pattern.

The further investigations made by the present inventors clarified the reason for this failure. Namely, conventional studies have focused only on an influence of back light that is transmitted light in a liquid crystal display device in which an oriented polyester film having a reasonably high retardation value is used as a polarizer protective film, and an influence of light from outside the liquid crystal display device in an environment with external light or fluorescent lamps has not been considered.

Even in the conventional liquid crystal display device in which an oriented polyester film having a reasonably high retardation value is used as a polarizer protective film, reflected light of external light or fluorescent lamps causes occurrence of rainbow interference pattern to problematically lower the display quality. As a result, high suppression of rainbow interference pattern has not been achieved.

The present invention has been devised in consideration of the state of the art, and aims to provide a liquid crystal display device highly suppressing occurrence of rainbow interference pattern in images displayed on the liquid crystal display device, and a polarizer protective film used in the liquid crystal display device.

Solution to Problem

The present invention is a liquid crystal display device comprising: a backlight source, a liquid crystal cell, a color filter, a polarizer, and a polarizer protective film arranged in the stated order, wherein the polarizer protective film has a retardation of not less than 6000 nm, and a difference (nx−ny) of not less than 0.05 between a refractive index (nx) in a slow axis direction that is a highest refractive index direction in a plane and a refractive index (ny) in a fast axis direction that is orthogonal to the slow axis direction, and an absorption axis of the polarizer and the slow axis of the polarizer protective film are arranged to form an angle within a range of 0°±30° or 90°±30°.

In the liquid crystal display device according to the present invention, the back light source is preferably a white light-emitting diode.

The polarizer protective film is preferably formed of a material selected from the group consisting of a polyester resin, a polyolefin resin, a (meth)acrylic resin, a polyurethane resin, a polyether sulfone resin, a polycarbonate resin, a polysulfone resin, a polyether resin, a polyether ketone resin, a (meth)acrylonitrile resin, and a cycloolefin resin.

Another aspect of the present invention is a polarizer protective film which is used in the liquid crystal display device according to the present invention.

Hereinafter, the present invention is specifically described.

Additionally, in the present invention, unless otherwise specified, curable resin precursors such as monomers, oligomers and prepolymers are referred to as "resin".

As a result of intensive studies in consideration of the conventional problems, the present inventors have found out that a liquid crystal display device having the following configuration highly suppresses occurrence of rainbow interference pattern in displayed images even in an environment with external light or fluorescent lamps. Namely, a used polarizer protective film has a predetermined retardation value and a predetermined difference in the refractive index between the slow axis direction and the fast axis direction that is orthogonal to the slow axis direction. In addition, the polarizer protective film is arranged in such a manner that the slow axis thereof forms an angle of almost 0° or 90° with the absorption axis of a polarizer.

FIG. 1 is a cross-sectional view schematically illustrating an example of a liquid crystal display device of the present invention.

As illustrated in FIG. 1, a liquid crystal display device 10 of the present invention has a liquid crystal cell 11, a color filter 12, a polarizer 13, and a polarizer protective film 14 arranged in the stated order.

Though not illustrated, a back light source is provided next to the liquid crystal cell 11 on the side opposite the side of the color filter 12 in the liquid crystal display device 10 of the present invention. In addition, the liquid crystal cell 11 may be sandwiched between two polarizers. In such a case, a polarizer that is as same as the polarizer 13 is provided next to the liquid crystal cell 11 on the side opposite the side of the color filter 12. These two polarizers are commonly arranged in such a manner that their absorption axes form an angle of 90° (cross Nicol) with each other.

In the liquid crystal display device of the present invention, the polarizer protective film is arranged closest to the view side and has a retardation of not less than 6000 nm. The retardation of less than 6000 nm causes rainbow interference pattern in images displayed on the liquid crystal display of the present invention. The upper limit of the retardation of the polarizer protective film is not particularly limited, and is preferably about 30,000 nm. The retardation of more than 30,000 nm is not preferable because the effect in avoiding the rainbow interference pattern is not any more obtained and the film becomes considerably thick.

From the standpoint of avoiding the rainbow interference pattern and forming a thin film, the polarizer protective film preferably has a retardation of 10,000 to 20,000 nm.

The retardation is represented by the following equation:

$$\text{Retardation (Re)}=(nx-ny) \times d,$$

wherein nx indicates a refractive index in a direction (slow axis direction) in which the refractive index is largest in a plane of the polarizer protective film, ny indicates a refractive index in a direction (fast axis direction) orthogonal to the slow axis direction, and d indicates a thickness of the polarizer protective film.

The retardation is determined (measured angle of 0°, measurement wavelength of 548.2 nm) by using, for example, KOBRA-WR produced by Oji Scientific Instruments.

In the present invention, the "nx−ny" (hereinafter, also referred to as Δn) is not less than 0.05. The Δn of less than 0.05 may fail to provide sufficient effect of suppressing rainbow interference pattern. In addition, the film thickness required for obtaining the retardation value unfavorably becomes great. The lower limit of the Δn is preferably 0.07.

The material of the polarizer protective film is not particularly limited, provided that it satisfies the above retardation. For example, a material selected from the group consisting of a polyester resin, a polyolefin resin, a (meth)acrylic resin, a polyurethane resin, a polyether sulfone resin, a polycarbonate resin, a polysulfone resin, a polyether resin, a polyether ketone resin, a (meth)acrylonitrile resin, and a cycloolefin resin. Especially, the polarizer protective film is preferably formed of polyethylene terephthalate (PET) because polyethylene terephthalate is highly versatile and easily available. In the present invention, even a highly-versatile film such as a PET film can provide an polarizer protective film with which a liquid crystal display device with excellent display quality can be produced. In addition, PET is excellent in transparency, thermal characteristics, and mechanical properties. The retardation thereof can be controlled by stretching treatment. The intrinsic birefringence thereof is large. Accordingly, a comparatively large retardation is obtained even if the film is thin.

The polarizer protective film may be produced by any method, provided that the method satisfies the above retardation. For example, in the case of using the polyesters such as PET, the polyesters as materials are molten and extrusion-molded into a sheet shape. The molded unstretched polyester is subjected to transverse stretching with a tenter or the like at a temperature not lower than the glass transition temperature, followed by a heat treatment.

The transverse stretching temperature is preferably 80° C. to 130° C., and more preferably 90° C. to 120° C. The transverse stretching ratio is preferably 2.5 to 6.0 times, and more preferably 3.0 to 5.5 times. The transverse stretching ratio of more than 6.0 times tends to lower the transparency of a polarizer protective film formed of the resulting polyester. The transverse stretching ratio of less than 2.5 times has a smaller orientation tension, so that the resulting polarizer protective film has a smaller birefringence. As a result, the retardation may fail to be 6000 nm or more.

In the present invention, after the transverse stretching of the unstretched polyester under the above conditions with a biaxial stretching tester, the polyester may be subjected to stretching in a machine direction relative to the transverse direction (hereinafter, also referred to as longitudinal stretching). In such a case, the stretching ratio in the longitudinal stretching is preferably not more than 2 times. The stretching ratio of more than 2 times in the longitudinal stretching may fail to set the value of Δn within the above range.

The treatment temperature in the heat treatment is preferably 100° C. to 250° C., and more preferably 180° C. to 245° C.

An exemplary method for controlling the retardation of the polarizer protective film produced by the above method to 6000 nm or more is appropriate setting of the stretching ratio, the stretching temperature, and the film thickness of the polarizer protective film to be produced. Specifically, the retardation is likely to be higher as the stretching ratio is higher, the stretching temperature is lower, and the film thickness is larger. The retardation is likely to be lower as the stretching ratio is lower, the stretching temperature is higher, and the film thickness is smaller.

The thickness of the polarizer protective film is appropriately determined depending on the materials thereof and the like, and is preferably in a range of 20 to 500 μm. The thickness of less than 20 μm fails to set the retardation of the polarizer protective film to 6000 nm or more. In addition, the anisotropy of mechanical properties becomes evident so that the film is easily cracked or broken to lower the practical utility of the film as an industrial material. The thickness of more than 500 μm makes the polarizer protective film very rigid to lower the flexibility peculiar to polymer films. The practical utility of such a film as an industrial material is unfavorably lowered. The lower limit of the thickness of the polarizer protective film is more preferably 30 μm. The upper limit thereof is more preferably 400 μm and still more preferably 300 μm.

The polarizer protective film preferably has a transparency of 80% or more and more preferably 84% or more in a visible light range. The transparency can be determined in accordance with JIS K7361-1 (Plastics—Determination of the total luminous transmittance of transparent materials).

The polarizer protective film used in the liquid crystal display device of the present invention is another aspect of the present invention.

In the liquid crystal display device of the present invention, the polarizer protective film is arranged in such a manner that an angle formed by the slow axis of the polarizer protective film and the absorption axis of a polarizer mentioned later (polarizer arranged on the view side of the liquid crystal cell) is 0°±30° or 90°±30°. The angle formed by the slow axis of the polarizer protective film and the absorption axis of the polarizer in the above range greatly suppresses occurrence of rainbow interference pattern in images displayed on the liquid crystal display device of the present invention. The reason for this is not clarified but presumably as follows.

Namely, in the environment without external light or light of fluorescent lamps (hereinafter, such an environment is also referred to as "dark place"), occurrence of rainbow interference pattern is suppressed when the angle formed by the slow axis of the polarizer protective film and the absorption axis of the polarizer is 0°, 90°, or 45°. In the case where the angle formed by the slow axis of the polarizer protective film and the absorption axis of the polarizer is 0° or 90°, "$\sin^2 2\theta$" in the equation "$I/I_0 = \sin^2 2\theta \cdot \sin^2(\pi Re/\lambda)$" becomes 0 to inhibit light transmission, so that rainbow interference pattern does not occur. In contrast, in the case where the angle formed by the slow axis of the polarizer protective film and the absorption axis of the polarizer is 45°, the light transmittance reaches the maximum rate to suppress occurrence of rainbow interference pattern in the case of a back light source having a continuous and wide spectrum. In the equation, $I/I_0$ indicates a transmittance of light passing through two polarizers arranged in a cross-Nicol configuration, I indicates an intensity of the light having passed through the two polarizers arranged in a cross-Nicol configuration, and $I_0$ indicates an intensity of light entering the two polarizers arranged in a cross-Nicol configuration.

In the environment with external light or light of fluorescent lamps (hereinafter, such an environment is also referred to as "bright place"), however, since the external light or light of fluorescent lamps does not necessarily have a continuous and wide spectrum, the display quality is lowered by occurrence of rainbow interference pattern unless the angle formed by the slow axis of the polarizer protective film and the absorption axis of the polarizer is 0° or 90°. The reason for this phenomenon is presumably that the reflected light of light of fluorescent lamps entering the screen of the liquid crystal display is mainly S polarized light (light vibrating in the transverse direction of the display screen). The S polarized light passes through the polarizer protective film, reflects on the interface between the polarizer protective film and the polarizer, and comes back to the viewer side. In the case where the angle formed by the slow axis of the polarizer protective film and the absorption axis of the polarize is set to 45°, light not having a continuous and wide spectrum has a phase difference, leading to occurrence of rainbow interference pattern.

In the liquid crystal display device of the present invention, the angle formed by the absorption axis of the polarizer and the slow axis of the polarizer protective film is 0°±30° or 90°±30°, preferably 0°±10° or 90°±10°, more preferably 0°±7° or 90°±7°, still more preferably 0°±3° or 90°±3°, and most preferably 0° or 90°.

In the liquid crystal display device of the present invention, the polarizer protective film has an orientation angle difference in the slow axis direction of preferably not more than 6°, more preferably not more than 4°, and still more preferably not more than 2°. If the polarizer protective film has an orientation angle difference of not more than 6°, occurrence of rainbow interference pattern is especially avoided in the case where the angle formed by the absorption axis of the polarizer and the slow axis of the polarizer protective film is set to 0° or 90°. The reason for this is mentioned below.

Namely, when the polarizer protective film is provided to form a specific angle θ with the polarizers arranged in a cross-Nicol configuration, the transmittance of light passing between the polarizers is represented by the following formula:

$$I/I_0 = \sin^2 2\theta \cdot \sin^2(\pi Re/\lambda),$$

wherein I indicates an intensity of light having passed between the polarizers arranged in a cross-Nicol configuration, and $I_0$ indicates an intensity of light entering between the polarizers arranged in a cross-Nicol configuration.

In this case, when the angle (θ) formed by the absorption axis of the polarizer and the slow axis of the polarizer protective film is set to 45°, the light transmittance reaches the maximum rate. Since the transmittance varies in accordance with the retardation of the polarizer protective film and the wavelength of the transmitted light, interference colors (rainbow interference pattern and the like) peculiar to the retardation value is observed. Here, when the angle (θ) is set to 0° or 90° as in the present invention, the transmittance of light is zero and no interference colors are observed.

On that occasion, if a birefringent film used as the polarizer protective film has a large orientation angle difference exceeding 6°, the transmittance of light increases to cause occurrence of the interference colors.

The orientation angle difference of the polarizer protective film is determined as the value obtained by subtracting the minimum orientation angle from the maximum orientation angle measured, for example, using a Molecular Orientation Analyzer (MOA) produced by Oji Scientific Instruments.

The slow axis direction of the polarizer protective film is a direction of an average orientation angle in the slow axis direction of the polarizer protective film obtained using Molecular Orientation Analyzer (MOA).

In the liquid crystal display device of the present invention, the back light source is not particularly limited, and is preferably a white light-emitting diode (white LED).

The white LED is of a phosphor type, that is, an element emitting white color in which a phosphor is combined with a light emitting diode that includes a compound semiconductor and emits blue light or UV light. Particularly, a white light-emitting diode including a light emitting element in which a blue light-emitting diode including a compound semiconductor and an yttrium.aluminum.garnet yellow phosphor are combined is preferable as the back light source in the present invention because it effectively suppresses rainbow interference pattern owing to its continuous and wide emission spectrum and has excellent luminous efficiency. Additionally, since a white LED with low power consumption becomes widely available, energy conservation is promoted.

The polarizer is not particularly limited, provided that it has desired polarizing characteristics. A common polarizer used in a liquid crystal display device may be used. Specifically, a polarizer that is formed of a stretched polyvinyl alcohol film and contains iodine is preferably used.

The liquid crystal cell is not particularly limited, and known liquid crystal cells commonly used in a liquid crystal display device may be used. Liquid crystal cells for a liquid crystal display device are known to have a display format such as TN, STN, VA, IPS, and OCB. In the present invention, liquid crystal cells having any of these display formats may be used.

The color filter is not particularly limited, and a known color filter commonly used in a liquid crystal display device may be used. Such a color filter commonly has transparent colored patterns of red, green, and blue. Each of the transparent colored patterns is formed of a resin composition in which a coloring agent is dissolved or dispersed, preferably pigment particles are dispersed. The color filter may be formed by preparing ink compositions each colored in a predetermined color and printing the compositions in accordance with the coloring patterns. The color filter is more preferably formed by photolithography using a photosensitive resin composition of a paint type containing a coloring agent of a predetermined color.

The liquid crystal display device of the present invention may be provided with another polarizer protective film on the face opposite the face where the polarizer protective film for the above polarizers is provided. Such another polarizer can prevent exposure of the polarizer to moisture or the like in the air or change in the size of the polarizer.

The other polarizer protective film is not particularly limited, provided that it is transparent. The polarizer protective film preferably has a transmittance in a visible light region of not less than 80% and more preferably not less than 90%. The transmittance is determined in accordance with JIS K7361-1 (Determination of the total luminous transmittance of transparent materials).

Examples of the material of the other polarizer protective film include resin materials such as cellulose derivatives, cycloolefin resins, polymethyl methacrylates, polyvinyl alcohols, polyimides, polyarylates, polyethylene terephthalates, polysulfones, polyether sulfones, amorphous polyolefins, modified acrylic polymers, polystyrenes, epoxy resins, polycarbonates, and polyesters. Particularly, cellulose derivatives or cycloolefin polymers are preferably used as the resin material.

The cellulose derivatives are not particularly limited, provided that they have desired transparency, moisture permeability, and the like. Particularly, cellulose acetates are particularly preferably used.

As the cellulose acetates, triacetylcellulose having an average acetylation degree of 57.5% to 62.5% (substitution degree of 2.6 to 3.0) is most preferably used. The acetylation degree refers to the amount of combined acetic acid per unit mass of cellulose. The acetylation degree is determined by measurement and calculation of the acetylation degree in accordance with ASTM: D-817-91 (Testing methods for cellulose acetate etc.).

The cycloolefin polymers are not particularly limited, provided that they are resins having monomer units of cyclic olefins (cycloolefins). Examples of the monomer formed of cyclic olefins include norbornene and polycyclic norbornene polymers.

As the cycloolefin polymer, both cycloolefin polymers (COP) and cycloolefin copolymers (COC) can be favorably used. The cycloolefin polymer may be homopolymers or copolymers of monomers formed of the cyclic olefins.

The cycloolefin polymer preferably has a saturated water absorption at 23° C. of 1% by mass or less and more preferably within a range of 0.1% by mass to 0.7% by mass. Use of such a cycloolefin polymer can make the other polarizer protective film hardly have a change in the optical characteristics or size due to water absorption.

The saturated water absorption is obtained by measurement of the increased weight of the cycloolefin polymer immersed in water at 23° C. for a week in accordance with ASTM D570.

The cycloolefin polymer preferably has a glass transition temperature within a range of 100° C. to 200° C., more preferably 100° C. to 180° C., and still more preferably 100° C. to 150° C. The glass transition temperature within the above range improves the heat resistance and the processability of the other polarizer protective film.

Specific examples of the other polarizer protective film formed of the cycloolefin resins include Topas produced by Ticona, ARTON produced by JSR corporation, ZEONOR and ZEONEX both produced by ZEON CORPORATION, and APEL produced by Mitsui Chemicals, Inc.

The other polarizer protective film may have a monolayer structure or a structure in which multiple layers are stacked. The structure in which multiple layers are stacked may be a structure in which layers formed of the same composition are stacked or a structure in which layers formed of various compositions are stacked.

The other polarizer protective film may have refractive index anisotropy to have optical compensation function.

Namely, in the present invention, an optical compensation film (phase difference film) for a liquid crystal display device may be used as the other polarizer protective film. Exemplary embodiments where the other polarizer protective film has an optical compensation function include an embodiment where a film formed of the above material contains a compound having a refractive index anisotropy and an embodiment where a layer containing a compound having a refractive index anisotropy is formed on the film.

Any of these embodiments is suitably used in the present invention. The latter embodiment is more preferable in terms of easiness of optional adjustment of the refractive index anisotropy in accordance with applications.

Exemplary compounds having a refractive index anisotropy include rod-shaped compounds, disk-shaped compounds, and liquid crystal compounds. These compounds having a refractive index anisotropy may exert excellent optical compensation function by ordered orientation. Accordingly, from the standpoint of orientation stability, a compound having a polymerizable functional group is preferably used.

The polarizer protective film and the other polarizer protective film may be laminated on the polarizer via an adhesive layer.

Adhesives used in the adhesive layer are not particularly limited, and examples thereof include hydrophilic adhesives such as polyvinyl alcohol and polyvinyl pyrrolidone, acrylic adhesives, urethane adhesives, and epoxy adhesives. In particular, in a hydrophobic polarizer protective film such as a PET film, a UV-curable adhesive layer is preferable.

In a polarizer protective film having a high UV transmittance, the adhesive layer preferably contains a UV absorbent.

In the liquid crystal display device of the present invention, a single or multiple optional layers may be formed on the polarizer protective film.

The optional layers are not particularly limited, and examples thereof include a hard coating layer, an antistatic layer, a low refractive layer, a high refractive layer, an antiglare layer, and a antifouling layer.

The hard coating layer secures the hard coating characteristic of the surface of the liquid crystal display device of the present invention, and is preferably formed of, for example, a composition for a hard coating layer containing an ionizing radiation-curable resin that is cured by UV rays or electron beams and a photopolymerization initiator.

Examples of the ionizing radiation-curable resin include compounds having one or two or more unsaturated bonds of a compound having an acrylate functional group and the like. Examples of the compound having one unsaturated bond include ethyl (meth)acrylate, ethyl hexyl (meth)acrylate, styrene, methylstyrene, and N-vinyl pyrrolidone. Examples of the compound having two or more unsaturated bonds include polyfunctional compounds such as polymethylolpropane tri(meth)acrylate, hexandiol (meth)acrylate, tripropylene glycol di(meth)acrylate, diethyleneglycol di(meth)acrylate, pentaerythritol tri(meth)acrylate, dipentaerythritol hexa(meth)acrylate, 1,6-hexanediol di(meth)acrylate, neopentylglycol di(meth)acrylate, and reaction products of any of the polyfunctional compounds and (meth)acrylate (e.g. poly(meth)acrylate esters of polyvalent alcohols), and the like. The term "(meth)acrylate" herein refers to methacrylate and acrylate.

In addition to the above compounds, also usable as the ionizing radiation-curable resin are polyester, polyether, acryl, epoxy, urethane, alkyd, spiroacetal, polybutadiene, and polythiol polyene resins having comparatively low molecular weights with unsaturated double bonds.

The ionizing radiation-curable resin may be used in combination with a solvent-drying resin (resin formed into a coating film only by drying the solvent added for adjusting the solids content in application, e.g. thermoplastic resins). Combination use of a solvent-drying resin effectively prevents defective coating on the application surface. The solvent-drying resin usable with the ionizing radiation-curable resin is not particularly limited, and may be a thermoplastic resin.

The thermoplastic resin is not particularly limited, and examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber/elastomers. The thermoplastic resin is preferably amorphous and soluble in an organic solvent (especially a common solvent dissolving a plurality of polymers and curable compounds). From the standpoint of film-forming properties, transparency, and weather resistance, preferable resins are styrene resins, (meth)acrylic resins, alicyclic olefin resins, polyester resins, and cellulose derivatives (cellulose esters).

The composition for a hard coating layer may contain a thermosetting resin.

The thermosetting resin is not particularly limited, and examples thereof include phenol, urea, diallyl phthalate, melamine, guanamine, unsaturated polyester, polyurethane, epoxy, aminoalkyd, melamine-urea cocondensated, silicone, and polysiloxane resins.

The photopolymerization initiator is not particularly limited, and a known photopolymerization initiator may be used. Specific examples thereof include acetophenones, benzophenones, Michler's benzoylbenzoates, α-amyloxime esters, thioxanthones, propiophenones, benzyls, benzoins, and acylphosphine oxides. Combination use with a photosensitizer is preferable. Specific examples of the photosensitizer include n-butylamine, triethylamine, and poly-n-butylphosphine.

In the case where the ionizing radiation-curable resin is a resin having a radical polymerizable unsaturated group, preferable examples of the photopolymerization initiator include acetophenones, benzophenones, thioxanthones, benzoins, and benzoin methylethers. Each of these may be used alone, or two or more of them may be used in combination. In the case where the ionizing radiation-curable resin is a resin having a cationic polymerizable functional group, preferable examples of the photopolymerization initiator include aromatic diazonium salts, aromatic sulfonium salts, aromatic iodonium salts, metallocene compounds, benzoin sulfonic acid esters. Each of these may be used alone, or two or more of them may be used in combination.

The amount of the photopolymerization initiator in the composition for a hard coating layer is preferably 1 to 10 parts by weight for 100 parts by weight of the ionizing radiation-curable resin. An amount of less than 1 part by weight of the photopolymerization initiator may fail to set the hardness of the hard coating layer in the liquid crystal display device of the present invention within the above-mentioned range. An amount of more than 10 parts by weight may fail to achieve the aimed pencil hardness of not lower than 3H on the surface of the hard coating layer because the ionizing radiation-curable resin cannot reach the deep part of the film.

The lower limit of the amount of the photopolymerization initiator is more preferably 2 parts by weight, and the upper limit thereof is more preferably 8 parts by weight. The amount of the photopolymerization initiator within that range prevents hardness distribution in the thickness direction of the film, easily resulting in the uniform hardness.

The composition for a hard coating layer may contain a solvent.

The solvent may be selected in accordance with the kind and solubility of the resin component to be used. Examples thereof include ketones (e.g. acetone, methyl ethyl ketone, methyl isobutyl ketone, cyclohexanone, diacetone alcohol), ethers (dioxane, tetrahydrofuran, propylene glycol monomethyl ether, propylene glycol monomethyl ether acetate), aliphatic hydrocarbons (e.g. hexane), alicyclic hydrocarbons (e.g. cyclohexane), aromatic hydrocarbons (e.g. toluene, xylene), halogenated carbons (e.g. dichloromethane, dichloroethane), esters (e.g. methyl acetate, ethyl acetate, butyl acetate), water, alcohols (e.g. ethanol, isopropanol, butanol, cyclohexanol), cellosolves (e.g. methyl cellosolve, ethyl cellosolve), cellosolve acetates, sulfoxides (e.g. dimethyl sulfoxide), and amides (e.g. dimethyl formamide, dimethyl acetoamides). Each of these may be used in a mixture with other components.

The proportion (solids content) of the materials in the composition for a hard coating layer is not particularly limited, and is commonly 5% to 70% by mass, and preferably 25% to 60% by mass.

The composition for a hard coating layer may contain conventionally known additives such as dispersants, surfactants, antistatic agents, silane coupling agents, viscosifiers, coloring inhibitors, colorants (pigment, dye), antifoam agents, leveling agents, flame retardants, UV absorbers, tackifiers, polymerization inhibitors, antioxidants, surface modifiers, and lubricants in accordance with the purposes such as increasing the hardness of the hard coating layer, suppressing shrinkage on curing, controlling the refractive index, and providing an antiglare property.

The composition for a hard coating layer may be used in the form of a mixture with a photosensitizer. Specific examples of the photosensitizer include n-butylamine, triethylamine, and poly-n-butylphosphine.

A method for preparing the composition for a hard coating layer is not particularly limited, provided that the components can be uniformly mixed. A known device may be used such as a paint shaker, a bead mill, a kneader, and a mixer.

A method for applying the composition for a hard coating layer to the polarizer protective film is not particularly limited, and a known method may be used such as spin coating, dipping, spraying, die coating, bar coating, roll coating, meniscus coating, flexo printing, screen printing, and bead coating.

Preferably, the film formed by applying the composition for a hard coating layer to the polarizer protective film is optionally heated and/or dried followed by active energy ray irradiation for curing.

Examples of the active energy ray irradiation include UV irradiation and electron beam irradiation. Specific examples of UV sources include light sources such as ultra-high pressure mercury lamps, high pressure mercury lamps, low-pressure mercury lamps, carbon-arc lamps, black-light fluorescent lamps, and metal halide lamps. The wavelength of the UV rays may be 190 to 380 nm. Specific examples of electron beam sources include various electron beam accelerators such as Cockcroft-Walton type, Bandegraft type, resonance transformer type, insulated core transformer type, linear type, Dynamitron type, and high frequency type.

The hard coating layer (cured) has a thickness of 0.1 to 100 µm, and preferably 0.8 to 20 µm. The thickness of the hard coating layer is a cross sectional thickness observed with an electron microscope (SEM, TEM, STEM).

The antistatic layer can be formed, for example, by adding an antistatic agent to the composition for a hard coating layer.

Conventionally known antistatic agents may be used, and examples thereof include cationic antistatic agents such as quaternary ammonium salt, fine particles such as tin doped indium oxide (ITO), and conductive polymers.

In the case of using the antistatic agent, the amount thereof is preferably 1% to 30% by mass.

The antiglare layer can be formed, for example, by adding an antiglare agent to the composition for a hard coating layer.

The antiglare agent is not particularly limited, and known inorganic or organic particles may be used.

The average particle size of the particles is not particularly limited, and is commonly about 0.01 to 20 µm.

The shape of the particles may be any of a spherical form, an elliptical form and other forms, and is preferably the spherical form.

The particles provide the antiglare property, and are preferably transparent particles. Specific examples of inorganic particles include silica beads, and specific examples of organic particles include plastic beads.

Specific examples of the plastic beads include styrene beads (refractive index of 1.60), melamine beads (refractive index of 1.57), acrylic beads (refractive index of 1.49), acryl-styrene beads (refractive index of 1.54), polycarbonate beads, and polyethylene beads.

The low refractive layer is a layer for lowering the reflectance of light from the outside (e.g. fluorescent lamps, natural light) reflecting on the surface of the polarizer protective film.

The low refractive layer has a refractive index smaller than that of the polarizer protective film and larger than that of the air.

The low refractive layer preferably has a refractive index to the light having passed through the polarizer protective film of 1.1 to 2.0, more preferably 1.2 to 1.8, and still more preferably 1.3 to 1.6. The low refractive layer having a refractive index within the above range improves the display quality of the liquid crystal display device of the present invention.

The refractive index of the low refractive layer may gently change toward the refractive index of the air from the polarizer protective film side to the air side in the low refractive index layer.

The material of the low refractive layer is not particularly limited, provided that a low refractive layer having the above-mentioned refractive index can be formed. Preferable examples thereof include the same resin material as those mentioned in the description of the composition for a hard coating layer.

The low refractive layer may contain, in addition to the resin material, silicone-containing copolymers, fluorine-containing copolymers, and particles so that the refractive index thereof can be adjusted.

Examples of the silicone-containing copolymers include silicone-containing vinylidene copolymers. Specific examples of the fluorine-containing copolymers include copolymers obtainable by copolymerization of a monomer composition containing vinylidene fluoride and hexafluoropropylene.

Examples of the particles include silica particles, acrylic particles, styrene particles, acryl-styrene copolymer particles, and particles with voids. The term "particles with voids" herein refers to particles in which a structure filled with gas and/or a porous structure containing gas is formed and the refractive index thereof is lowered from the original refractive index in inverse proportion to the gas occupation ratio of the particles.

The antifouling layer is a layer for suppressing adhesion of stains (finger prints, aqueous or solvent inks, pencil marks) to the top surface of the liquid crystal display device of the present invention and for allowing easy wiping of the stains. Additionally, formation of the antifouling layer enables to improve the antifouling property and the excoriation resistance of the liquid crystal display device of the present invention.

The antifouling layer can be formed of a composition containing a antifouling agent and a resin.

The antifouling agent mainly aims to prevent stains on the top surface of the liquid crystal display device of the present invention, and provides the liquid crystal display device of the present invention with the excoriation resistance.

Examples of the antifouling agent include fluorine compounds, silicon compounds, and mixed compounds of these. More specifically, silane coupling agents having fluoroalkyl groups such as 2-perfluorooctyl ethyltriaminosilane is exemplified. Especially, those having amino groups are preferably used.

The resin is not particularly limited, and those exemplified for the composition for a hard coating layer may be used.

The antifouling layer may be formed on the hard coating layer. Especially, the antifouling layer is preferably formed as the top surface.

The antifouling layer may be substituted with the hard coating layer provided with the antifouling property.

In the liquid crystal display device of the present invention, the optional layers are commonly formed on the view side (top surface side) of the polarizer protective film, but may also be provided on the color filter side of the polarizer protective film.

Advantageous Effects of Invention

The present invention has the above-mentioned structure so as to provide a liquid crystal display device highly suppressing occurrence of rainbow interference pattern in displayed images.

DESCRIPTION OF EMBODIMENTS

Figure 1:
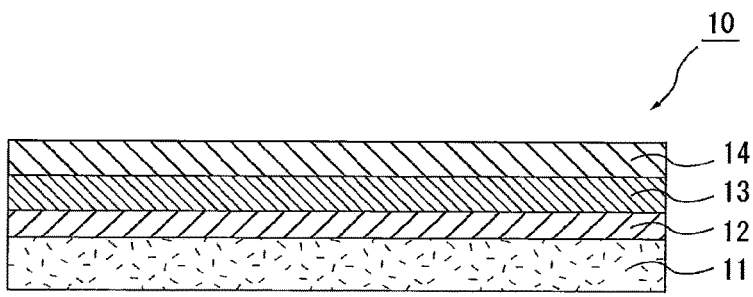
FIG. 1 is a cross-sectional view schematically illustrating one example of the liquid crystal display device of the present invention.
Figure 2:
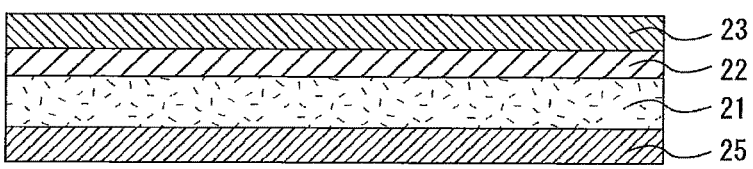
FIG. 2 is a cross-sectional view schematically illustrating one example of a conventional liquid crystal display device.

The present invention will be described by means of the following examples which are not intended to limit the scope of the present invention. Here, "parts" and "%" are based on mass unless otherwise stated.

Example 1

A polyethylene terephthalate material was molten at 290° C. and extruded into a sheet-shaped film through a film-forming dye. The film was made in contact with a rotational quenching drum chilled with water for cooling purposes, so that an unstretched film was produced. The unstretched film was preheated at 120° C. for a minute, and stretched by 4.5 times at 120° C. using a biaxial stretching tester (TOYO SEIKI SEISAKU-SHO, LTD.). The resulting film was then stretched by 1.5 times in a direction at 90 degrees to the first stretching direction. As a result, a polarizer protective film (retardation of 9900 nm, film thickness of 100 μm, Δn of 0.099) was obtained.

The resulting polarizer protective film was placed on a polarizer on the viewer side in a liquid crystal monitor (FLATORON IPS226V produced by LG Electronics Japan) to produce a liquid crystal display device. The polarizer protective film was placed in such a manner that an angle formed by the slow axis of the polarizer protective film and the absorption axis of the polarizer on the viewer side in the liquid crystal monitor was 0°.

Example 2

A liquid crystal display device was produced in the same manner as in Example 1, except that the angle formed by the slow axis of the polarizer protective film and the absorption axis of the polarizer on the viewer side in the liquid crystal monitor was changed to 30°.

Example 3

A liquid crystal display device was produced in the same manner as in Example 1, except that the angle formed by the slow axis of the polarizer protective film and the absorption axis of the polarizer on the viewer side in the liquid crystal monitor was changed to 60°.

Example 4

A liquid crystal display device was produced in the same manner as in Example 1, except that the angle formed by the slow axis of the polarizer protective film and the absorption axis of the polarizer on the viewer side in the liquid crystal monitor was changed to 90°.

Example 5

The stretch ratio of an unstretched film produced in the same manner as in Example 1 was adjusted so that a polarizer protective film having a retardation of 8200 nm, a film thickness of 92 μm, and Δn of 0.089 was obtained. A liquid crystal display device was produced in the same manner as in Example 1, except that the obtained polarizer protective film was used.

Example 6

The stretch ratio of an unstretched film produced in the same manner as in Example 1 was adjusted so that a polarizer protective film having a retardation of 19000 nm, a film thickness of 190 μm, and Δn of 0.100 was obtained. A liquid crystal display device was produced in the same manner as in Example 1, except that the obtained polarizer protective film was used.

Example 7

The stretch ratio of an unstretched film produced in the same manner as in Example 1 was adjusted so that a polarizer protective film having a retardation of 7500 nm, a film thickness of 75 μm, and Δn of 0.100 was obtained. The polarizer protective film was placed in such a manner that an angle formed by the slow axis (average orientation angle) thereof and the absorption axis of the polarizer on the viewer side in the liquid crystal monitor was set to 0°.

Example 8

The stretch ratio of an unstretched film produced in the same manner as in Example 1 was adjusted so that a polarizer protective film having a retardation of 7500 nm, a film thickness of 94 μm, and Δn of 0.08 was obtained. The polarizer protective film was placed in such a manner that an angle formed by the slow axis (average orientation angle) thereof and the absorption axis of the polarizer on the viewer side in the liquid crystal monitor was set to 0°.

Example 9

The stretch ratio of an unstretched film produced in the same manner as in Example 1 was adjusted so that a polarizer protective film having a retardation of 6100 nm, a film thickness of 61 μm, and Δn of 0.100 was obtained. The polarizer protective film was placed in such a manner that an angle formed by the slow axis (average orientation angle) thereof and the absorption axis of the polarizer on the viewer side in the liquid crystal monitor was set to 0°.

Example 10

The stretch ratio of an unstretched film produced in the same manner as in Example 1 was adjusted so that a polarizer protective film having a retardation of 6100 nm, a film thickness of 81 μm, and Δn of 0.075 was obtained. The polarizer protective film was placed in such a manner that an angle formed by the slow axis (average orientation angle) thereof and the absorption axis of the polarizer on the viewer side in the liquid crystal monitor was set to 0°.

Comparative Example 1

A liquid crystal display device was produced in the same manner as in Example 1, except that an angle formed by the slow axis of the polarizer protective film and the absorption axis of the polarizer on the viewer side in the liquid crystal monitor was set to 45°.

Comparative Example 2

The stretch ratio of an unstretched film produced in the same manner as in Example 1 was adjusted so that a polarizer protective film having a retardation of 5200 nm, a film thickness of 52 μm, and Δn of 0.100 was obtained. The polarizer protective film was placed in such a manner that an angle formed by the slow axis (average orientation angle) thereof and the absorption axis of the polarizer on the viewer side in the liquid crystal monitor was set to 0°.

Comparative Example 3

The polarizer protective film obtained in Example 9 was placed in such a manner that an angle formed by the slow axis (average orientation angle) thereof and the absorption axis of the polarizer on the viewer side in the liquid crystal monitor was set to 45°.

Comparative Example 4

A liquid crystal display device was produced in the same manner as in Example 1, except that a PET film A4100 having a retardation of 6200 nm, a film thickness of 188 μm, and Δn of 0.033 produced by TOYOBO CO., LTD. was used as the polarizer protective film.

Comparative Example 5

The stretch ratio of an unstretched film produced in the same manner as in Example 1 was adjusted so that a polarizer protective film having a retardation of 7500 nm, a film thickness of 188 μm, and Δn of 0.040 was obtained. A liquid crystal display device was produced in the same manner as in Example 1, except that the obtained polarizer protective film was used.

Comparative Example 6

The stretch ratio of an unstretched film produced in the same manner as in Example 1 was adjusted so that a polarizer protective film having a retardation of 6100 nm, a film thickness of 160 μm, and Δn of 0.038 was obtained. The polarizer protective film was placed in such a manner that an angle formed by the slow axis (average orientation angle) thereof and the absorption axis of the polarizer on the viewer side in the liquid crystal monitor was set to 0'.

(Evaluation of Rainbow Interference Pattern)

Images displayed on the liquid crystal display devices produced in the examples and the comparative examples were observed visually and over polarized sunglasses by five persons from the front and in an oblique direction (about 50 degrees) in a dark place and in a bright place (400 lx around the liquid crystal monitor) for determination of the presence or absence of rainbow interference pattern based on the following criteria.

Excellent: No rainbow interference pattern was present.
Good: Slight rainbow interference pattern was present. No problem in practical use.
Average: rainbow interference pattern was present.
Poor: Clear rainbow interference pattern was present.

Figure 3:
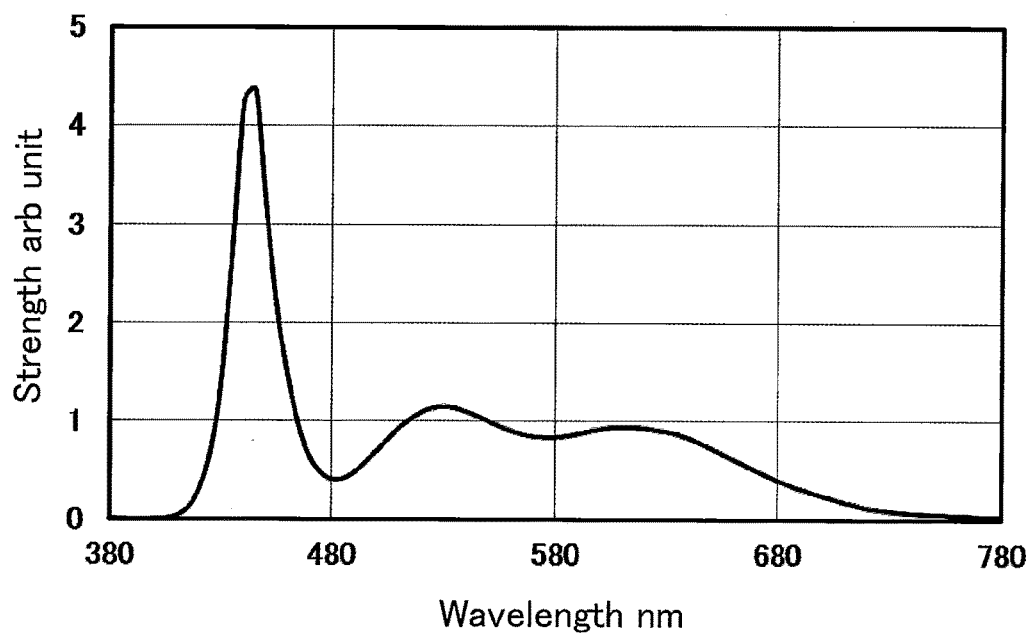
FIG. 3 illustrates an emission spectrum of a back light source of the liquid crystal monitor used in examples and comparative examples.
Figure 4:
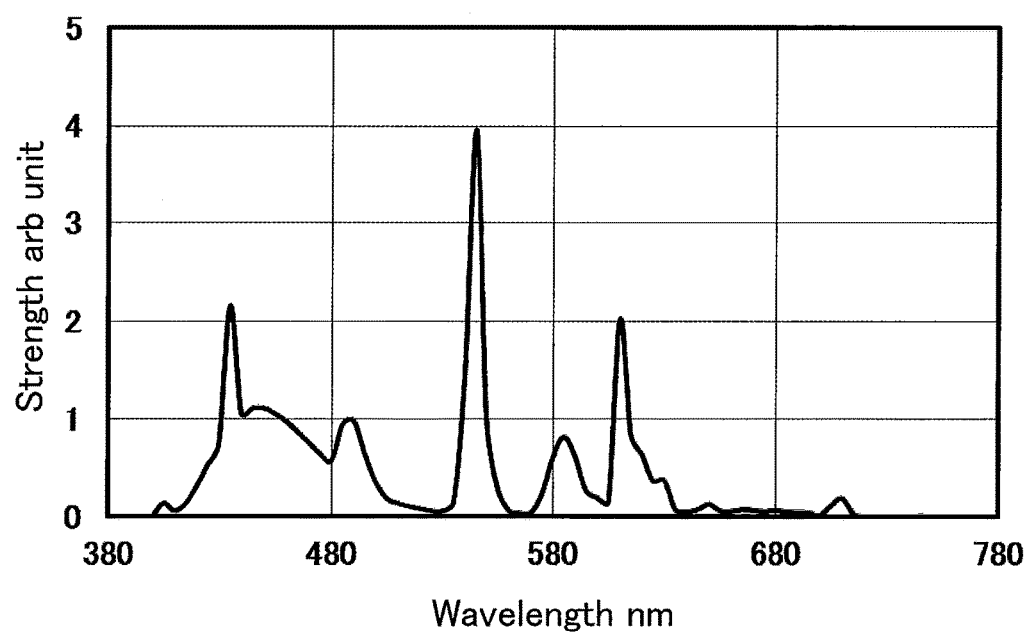
FIG. 4 illustrates an emission spectrum of external light used in evaluation of rainbow interference pattern in a bright place in the examples and the comparative examples.

FIG. 3 illustrates an emission spectrum of the backlight source of the liquid crystal monitor (FLATORON IPS 226V produced by LG Electronics Japan). FIG. 4 illustrates an emission spectrum of external light used in the evaluation of rainbow interference pattern in a bright place.

(Measurement of the Average Orientation Angle and the Orientation Angle Difference)

The average orientation angle and the orientation angle difference in the slow axis direction of the polarizer protective film was measured with regard to the liquid crystal display devices according to Examples 7 to 10, and Comparative Examples 3 and 6.

Figure 5:
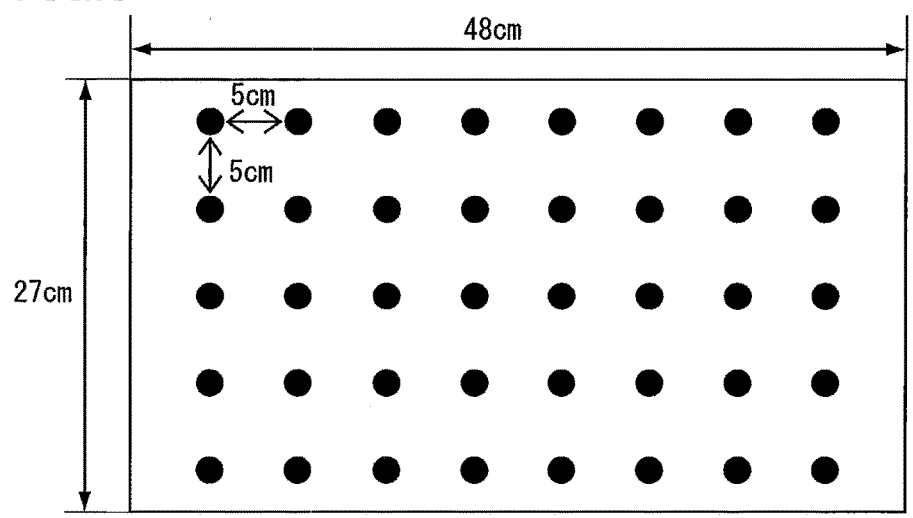
FIG. 5 is a view illustrating a method for measuring the average orientation angle and the orientation angle difference.

The measurement was performed using a Molecular Orientation Analyzer (MOA) produced by Oji Scientific Instruments. As illustrated in FIG. 5, the orientation angle was measured at 40 points at intervals of 5 cm in the vertical direction and in the transvers direction on a liquid crystal monitor (21.5 inches, 27 cm high and 48 cm wide). The average thereof was the average orientation angle. The orientation angle difference is the value obtained by subtracting the minimum orientation angle from the maximum orientation angle. Black dots in FIG. 5 indicate measured points.

rainbow interference pattern observed visually and over polarized sunglasses in a bright place and in a dark place. The liquid crystal display device according to Example 8 in which the orientation angle difference in the slow axis direction of the polarizer protective film was 1.7° was a bit inferior to the liquid crystal display device according to Example 7 in which the orientation angle difference was 0.8° in the evaluation of rainbow interference pattern over polarized sunglasses in a bright place and in a dark place.

Similarly, the liquid crystal display device according to Example 10 in which the orientation angle difference in the slow axis direction of the polarizer protective film was 2.2° was a bit inferior to the liquid crystal display device according to Example 9 in which the orientation angle difference was 1.1° in the evaluation of rainbow interference pattern over polarized sunglasses in a bright place and in a dark place.

In contrast, the liquid crystal display devices according to Comparative Examples 1 and 3 in which an angle formed between the slow axis of the polarizer protective film and the absorption axis of the polarizer was 45° were excellent in the evaluation of the rainbow interference pattern in a dark place but poor in the evaluation of the rainbow interference pattern in a bright place over polarized sunglasses. The liquid crystal display device according to Comparative Example 2 in which the retardation was less than 6000 nm was poor in the evaluation of rainbow interference pattern both in a bright place and in a dark place.

The liquid crystal display devices according to Comparative Examples 4 to 6 were each poor in the evaluation of rainbow interference pattern in a bright place and in a dark

TABLE 1

| | | | | | Evaluation of rainbow interference pattern | | | | | |
|---|---|---|---|---|---|---|---|---|---|---|
| | | | | Angle (°) of | Dark place | | Bright place | | Angle (°) of (average | |
| | Re (nm) | Film thickkness (μm) | Δn | (slow axis-absorption axis) | Visual observation | Over polarized sunglasses | Visual observation | Over polarized sunglasses | orientation angle (slow axis direction) - absorption axis) | Orientation angle difference (°) |
| Example 1 | 9900 | 100 | 0.099 | 0 | Excellent | Excellent | Excellent | Excellent | — | — |
| Example 2 | 9900 | 100 | 0.099 | 30 | Excellent | Excellent | Excellent | Good | — | — |
| Example 3 | 9900 | 100 | 0.099 | 60 | Excellent | Excellent | Excellent | Good | — | — |
| Example 4 | 9900 | 100 | 0.099 | 90 | Excellent | Excellent | Excellent | Excellent | — | — |
| Example 5 | 8200 | 92 | 0.089 | 0 | Excellent | Excellent | Excellent | Excellent | — | — |
| Example 6 | 19000 | 190 | 0.100 | 0 | Excellent | Excellent | Excellent | Excellent | — | — |
| Example 7 | 7500 | 75 | 0.100 | 0 | Excellent | Excellent | Excellent | Excellent | 0 | 0.8 |
| Example 8 | 7500 | 94 | 0.080 | 0 | Excellent | Excellent | Excellent | Good | 0 | 1.7 |
| Example 9 | 6100 | 61 | 0.100 | 0 | Excellent | Excellent | Excellent | Good | 0 | 1.1 |
| Example 10 | 6100 | 81 | 0.075 | 0 | Excellent | Good | Excellent | Good | 0 | 2.2 |
| Comparative Example 1 | 9900 | 100 | 0.099 | 45 | Excellent | Excellent | Excellent | Average | — | — |
| Comparative Example 2 | 5200 | 52 | 0.100 | — | Excellent | Average | Excellent | Average | — | — |
| Comparative Example 3 | 6100 | 61 | 0.100 | 45 | Excellent | Excellent | Excellent | Average | 45 | 1.1 |
| Comparative Example 4 | 6200 | 188 | 0.033 | 0 | Average | Poor | Average | Poor | — | — |
| Comparative Example 5 | 7500 | 188 | 0.040 | 0 | Average | Poor | Average | Poor | — | — |
| Comparative Example 6 | 6100 | 160 | 0.038 | 0 | Average | Poor | Average | Poor | 0 | 6.6 |

As shown in Table 1, the liquid crystal display devices according to the examples in which the polarizer protective film has a retardation of not less than 6000 nm and an angle formed by the slow axis of the polarizer protective film and the absorption axis of the polarizer is within a range of 0°±30° or 90°±30° are excellent in any of the evaluations of place because Δn thereof was less than 0.05, though the retardation thereof was not less than 6000 nm.

In comparison of the liquid crystal display devices according to Examples 9 and 10 and Comparative Example 6, the liquid crystal display device according to Comparative Example 6 was inferior to the liquid crystal display devices according to Examples 9 and 10 in the evaluation of rainbow interference pattern over polarized sunglasses in a bright place and in a dark place. The reason for this is presumably that the orientation angle difference in the slow axis direction of the polarizer protective film according to Comparative Example 6 was large as 6.6°, while the orientation angle difference in the slow axis direction of the polarizer protective film according to Examples 9 and 10 were as small as 1.1° and 2.2°, respectively.

INDUSTRIAL APPLICABILITY

The liquid crystal display device of the present invention is applicable to a liquid crystal display device provided with a polarizer protective film having a large retardation value, and highly suppresses occurrence of rainbow interference pattern in displayed images.

REFERENCE SIGNS LIST 10, 20: Liquid crystal display device
11, 21: Liquid crystal cell
12, 22: Color filter
13, 23, 25: Polarizer
14: Polarizer protective film

What is claimed is:

1. A display device comprising a structure with a polarizer protective film arranged between a view-side polarizer and a top surface of a view side of the display device,
   wherein the polarizer protective film has a retardation in a range from 6000 to 9900 nm, and has a difference (nx−ny) in a range of not less than 0.07, where nx is a refractive index in a slow axis direction that is a highest refractive index direction in a plane, and ny is a refractive index in a fast axis direction that is orthogonal to the slow axis direction,
   an absorption axis of the polarizer and the slow axis of the polarizer protective film are arranged to form an angle within a range of 0°±10° or 90°±10°,
   the polarizer protective film is formed of polyethylene terephthalate,
   the polarizer protective film has an orientation angle difference in the slow axis direction of not more than 6°, wherein the orientation angle is measured at 40 points equally spaced in a vertical direction and in a transverse direction over an entire display screen of a liquid crystal display device including the polarizer protective film, and the orientation angle difference is a value obtained by subtracting a minimum orientation angle from a maximum orientation angle, obtained from the 40 points,
   a thickness of the polarizer protective film is in a range from 20 µm to 100 µm, and
   the display device comprises a back light source comprising a white light-emitting diode.

2. The display device according to claim 1, comprising a plurality of polarizers, and wherein the polarizer protective film is arranged between a polarizer of the plurality of the polarizers closest to the view side of the device and the top surface of the view side of the device.

3. A polarizer laminate for a display device, comprising:
   a view-side polarizer;
   a polarizer protective film, and
   a low refractive index layer,
   wherein the polarizer protective film is configured to be used in a display device comprising a structure with the polarizer protective film arranged between the view-side polarizer and a top surface of a view side of the display device,
   the polarizer protective film has a retardation in a range from 6000 to 9900 nm, and has a difference (nx−ny) in a range of not less than 0.07, where nx is a refractive index in a slow axis direction that is a highest refractive index direction in a plane, and ny is a refractive index in a fast axis direction that is orthogonal to the slow axis direction,
   an absorption axis of the polarizer and the slow axis of the polarizer protective film are arranged to form an angle within a range of 0°±10° or 90°±10°,
   the polarizer protective film is formed of polyethylene terephthalate,
   the polarizer protective film has an orientation angle difference in the slow axis direction of not more than 6°, wherein the orientation angle is measured at 40 points equally spaced in a vertical direction and in a transverse direction over an entire display screen of a liquid crystal display device including the polarizer protective film, and the orientation angle difference is a value obtained by subtracting a minimum orientation angle from a maximum orientation angle, obtained from the 40 points,
   a thickness of the polarizer protective film is in a range from 20 µm to 100 µm, and
   the low refractive index layer has a refractive index smaller than that of the polarizer protective film, which changes toward the refractive index of the air from the polarizer protective film-side to the air-side.

* * * * *